United States Patent
Wu et al.

(10) Patent No.: US 10,460,460 B2
(45) Date of Patent: Oct. 29, 2019

(54) METHOD AND SYSTEM FOR GENERATING DEPTH INFORMATION

(71) Applicant: Wistron Corporation, New Taipei (TW)

(72) Inventors: Bo-Yi Wu, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 444 days.

(21) Appl. No.: 15/242,604

(22) Filed: Aug. 22, 2016

(65) Prior Publication Data

US 2017/0337703 A1 Nov. 23, 2017

(30) Foreign Application Priority Data

May 17, 2016 (TW) .............................. 105115210 A (51) Int. Cl.
*G06T 7/00* (2017.01)
*G06T 7/55* (2017.01)
*H04N 7/18* (2006.01)
*G06T 7/11* (2017.01)
*G06T 7/70* (2017.01)
*G06T 5/50* (2006.01)
*G06T 7/593* (2017.01)
*H04N 13/00* (2018.01)

(52) U.S. Cl.
CPC ................. *G06T 7/55* (2017.01); *G06T 5/50* (2013.01); *G06T 7/11* (2017.01); *G06T 7/596* (2017.01); *G06T 7/70* (2017.01); *H04N 7/18* (2013.01); *G06T 2207/10028* (2013.01); *H04N 13/00* (2013.01)

(58) Field of Classification Search
CPC ............. H04N 13/00; H04N 7/00; G06T 7/00
See application file for complete search history.

(56) References Cited

U.S. PATENT DOCUMENTS

| 2010/0245535 A1* | 9/2010 | Mauchly ................. G06T 15/20 348/14.08 |
| 2013/0027548 A1 | 1/2013 | Gere |
| 2014/0098199 A1* | 4/2014 | Yeatman, Jr. ........ H04N 13/239 348/48 |
| 2014/0104394 A1* | 4/2014 | Yanai .................... G06F 3/0304 348/47 |

* cited by examiner

*Primary Examiner* — Maryam A Nasri
(74) *Attorney, Agent, or Firm* — JCIPRNET (57) ABSTRACT

A method and a system including at least three image capturing devices for generating depth information are proposed. Multiple depth maps associated with a specific scene are obtained, where each of the depth maps corresponds to a different group of the image capturing devices and a different estimated region of the specific scene. For each pixel corresponding to the specific scene, whether the pixel is within a joint overlapping region of its estimated region is determined. If no, the depth information of the pixel is set according to its depth value in the depth map corresponding to a non-joint overlapping region of its estimated region. If yes, the depth information of the pixel is set according to its depth values in the depth maps corresponding to the joint overlapping region within its estimated region. An integrated depth map is generated by using the depth information of all the pixels.

17 Claims, 6 Drawing Sheets

METHOD AND SYSTEM FOR GENERATING DEPTH INFORMATION

CROSS-REFERENCE TO RELATED APPLICATION

This application claims the priority benefit of Taiwan application serial no. 105115210, filed on May 17, 2016. The entirety of the above-mentioned patent application is hereby incorporated by reference herein and made a part of this specification.

TECHNICAL FIELD

The disclosure relates to a method and a system for image processing, in particular to, a method and a system for generating depth information.

BACKGROUND

Through the development of frameworks in image processing, stereo vision has been extensively applied in many fields such as structured light, stereo image, distance detection, surveillance, and so forth. Stereo vision generally includes two stages. In the first stage, depth information would be generated by using a depth camera, a stereo camera, or a related algorithm. In the second stage, a stereo image would be generated by using the depth information. Hence, accurate depth information is rigidly important to provide a pleasant stereo viewing experience.

The fundamental of stereo vision is to simulate binocular disparity by left and right lenses spaced apart by an average distance between two eyes of a human, to generate stereo depth information of a captured scene according to offsets of each pair of corresponding pixels in images captured by the two lenses, and to thereby form a depth map of the scene. An actual distance D between each object and the lenses could be calculated through the use of the depth map based on Eq.(1):

$$D = \frac{B \times F}{d} \qquad \text{Eq.(1)}$$

where d denotes a depth value in the depth map, F denotes a focal length of the lenses, and B denotes a distance between optical axes of the lenses. However, a viewable range of the lenses is associated with the length of a baseline, and baselines with different lengths could result in different accuracy levels in estimating depth information at different distances. Hence, a region allowed for depth estimation and an accuracy of depth information would be inherently restricted due to only one baseline existing between the two lenses.

SUMMARY OF THE DISCLOSURE

Accordingly, the disclosure is directed to a method and a system for generating depth information, where a reliable range and an accuracy for depth estimation would be increased and the effectiveness of stereo vision application would be thereby enhanced.

According to an embodiment of the disclosure, a method for generating depth information adapted to a system having at least three image capturing devices is proposed. The method includes the following steps. First, multiple depth maps associated with a specific scene and corresponding to different device groups are obtained, where the device groups are different groups respectively formed by every two of the image capturing devices, each of the depth maps includes depth values and corresponds to a different estimated region of the specific scene, and each of the estimated regions and other of the estimated regions shares a joint overlapping region. Next, for each pixel corresponding to the specific scene, whether the estimated region in which the pixel is located corresponds to the joint overlapping region is determined; if no, the depth information of the pixel is set according to its depth value in a depth map corresponding to a non-joint overlapping region of the estimated region in which the pixel is located; and if yes, the depth information of the pixel is set according to its depth values in the depth maps corresponding to the joint overlapping region and an object distance corresponding to the pixel. Next, an integrated depth map is generated by using the depth information of all the pixels.

According to another embodiment of the disclosure, a system for generating depth information including at least three image capturing devices and an image processing device is proposed. The image capturing devices are respectively configured to capture images of a specific scene, where every two of the image capturing devices form different device groups. The image processing device is connected to each of the image capturing devices and configured to obtain depth maps associated with the specific scene and corresponding to the device groups according to the images captured by the image capturing devices and to determine whether the estimated region in which each pixel is located corresponds to the joint overlapping region. If no, the image processing device sets depth information of the pixel according to its depth value in a depth map corresponding to a non-joint overlapping region of the estimated region in which the pixel is located. If yes, the image processing device sets the depth information of the pixel according to its depth values in the depth maps corresponding to the joint overlapping region and an object distance corresponding to the pixel. The image processing device then generates an integrated depth map by using the depth information of all the pixels.

In summary, in the proposed method and the system for generating depth information, depth information of a specific scene is generated through the use of image capturing device groups with different lengths of baselines so that a reliable range as well as an accuracy for depth estimation would be increased.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

To make the above features and advantages of the application more comprehensible, several embodiments accompanied with drawings are described in detail as follows.

DESCRIPTION OF THE EMBODIMENTS

A viewable range of a stereo image capturing system is associated with the length of a baseline between two image capturing devices, and baselines with different lengths could result in different accuracy levels in estimating depth information at different distances. For example, for a baseline with the length of 5 cm, depth information of a captured object at a distance greater than 3 m would contain significant errors. For baselines with the lengths of 10 cm and 15 cm, their reliable ranges of depth information of a captured object could be extended to 5 m and 9 m respectively. The concept of the disclosure is to generate depth maps based on different lengths of baselines through the use of at least three image capturing devices and to generate a depth value for each pixel corresponding to a captured scene according to certain conditions so as to increase a reliable range and an accuracy for depth estimation.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

Figure 1:
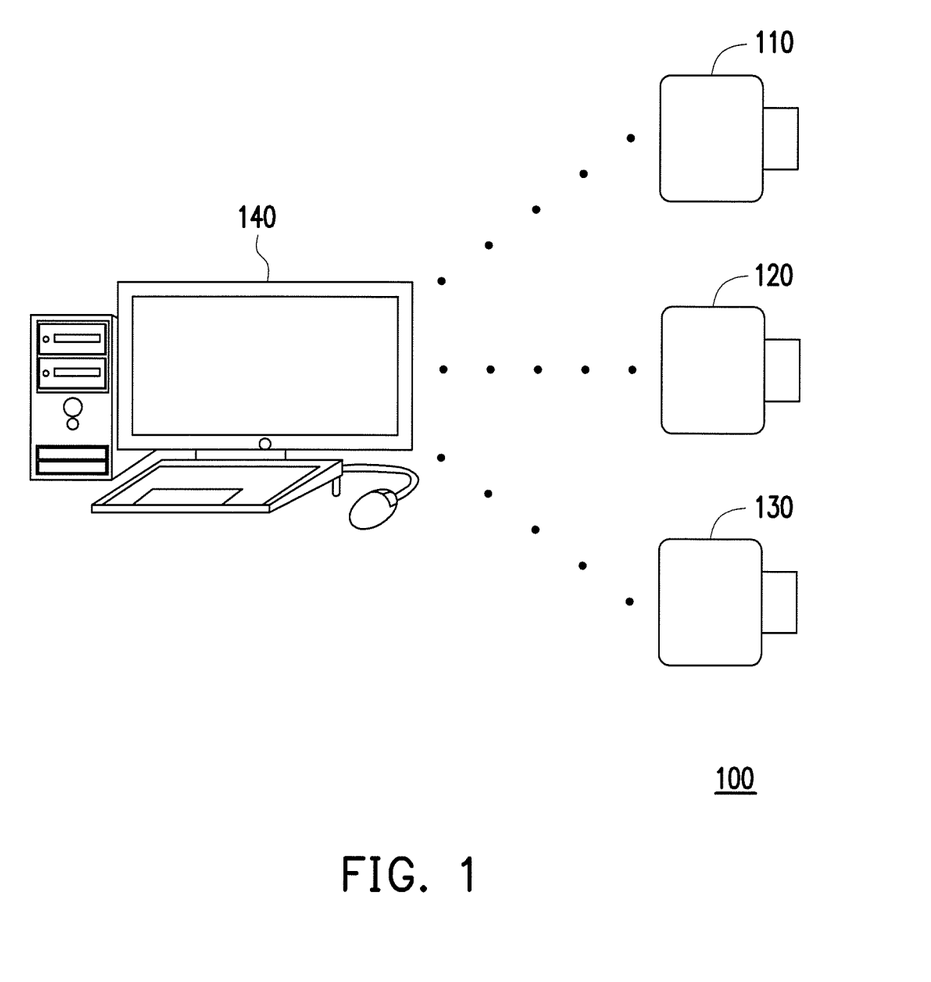
FIG. 1 illustrates a block diagram of a system for generating depth information according to an embodiment of the disclosure.

FIG. 1 illustrates a block diagram of a system for generating depth information according to an embodiment of the disclosure. It should, however, be noted that this is merely an illustrative example and the disclosure is not limited in this regard. All components of the system and their configurations are first introduced in FIG. 1. The detailed functionalities of the components are disclosed along with FIG. 2.

Referring to FIG. 1, a system 100 includes a first image capturing device 110, a second image capturing device 120, a third image capturing device 130, and an image processing device 140.

In the present embodiment, the first image capturing device 110, the second image capturing device 120, and the third image capturing device 130 could be image capturing devices such as digital cameras, single lens reflex cameras, digital camcorders that use charge-coupled-device (CCD) elements, complementary metal-oxide semiconductor (CMOS) elements, or other lens elements. In the present embodiment, the first image capturing device 110, the second image capturing device 120, and the third image capturing device 130 are collinearly disposed and equally spaced apart in sequence and are configured to capture a specific scene with a same field of view (FOV) and camera parameters. However, the disclosure is not limited in this regard.

In the present embodiment, the image processing device 140 could be an electronic device with image processing features such as a personal computer, a laptop computer, a smart phone, a tabular computer, and so forth. The image processing device 140 could include a memory, a processor, and a transmission module. The transmission module is configured to obtain images captured by the first image capturing device 110, the second image capturing device 120, and the third image capturing device through wired transmission or wireless transmission. The memory is configured to store the captured images, and the processor is configured to process the images stored in the memory to generate depth information of the captured scene. Detail steps of the method for generating depth information performed by the system 100 would be illustrated by the embodiments as follows.

Figure 2:
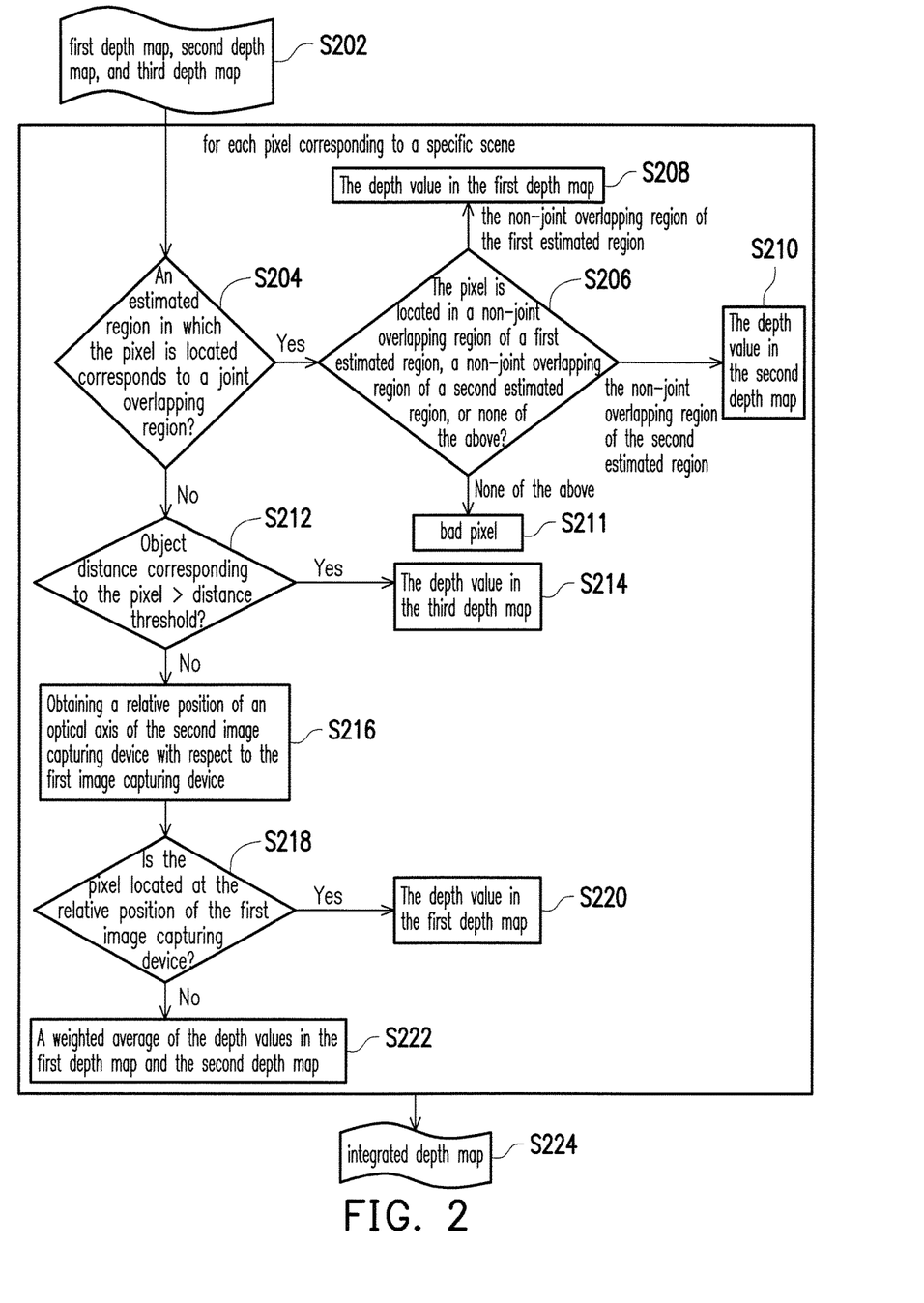
FIG. 2 illustrates a flowchart of a method for generating depth information according to an embodiment of the disclosure.

FIG. 2 illustrates a flowchart of a method for generating depth information according to an embodiment of the disclosure. The method in FIG. 2 could be implemented by the system 100 in FIG. 1.

Referring to FIG. 1 and FIG. 2, the image processing device 140 would first obtain depth maps associated with a specific scene and corresponding to different device groups (Step S202). The device groups are different groups respectively formed by every two of the first image capturing device 110, the second image capturing device 120, and the third image capturing device 130. For simplicity, the first image capturing device 110 and the second image capturing device 120 are referred to as "a first device group." The second image capturing device 120 and the third image capturing device 130 are referred to as "a second device group." The first image capturing device 110 and the third image capturing device 130 are referred to as "a third device group". Those skilled in the art would recognize that depth values only exist in an overlapping region between two images of a same scene concurrently captured by two image capturing devices. Herein, an overlapping region captured by the first device group is referred to as "a first estimated region", and a depth map formed by each depth value of the first estimated region is referred to as "a first depth map". An overlapping region captured by the second device group is referred to as "a second estimated region", and a depth map formed by each depth value of the second estimated region is referred to as "a second depth map". An overlapping region captured by the third device group is referred to as "a third estimated region", and a depth map formed by each depth value of the third estimated region is referred to as "a third depth map". According to the arrangement in the present embodiment, the first estimated region, the second estimated region, and the third estimated region would share a joint overlapping region.

Figure 3:
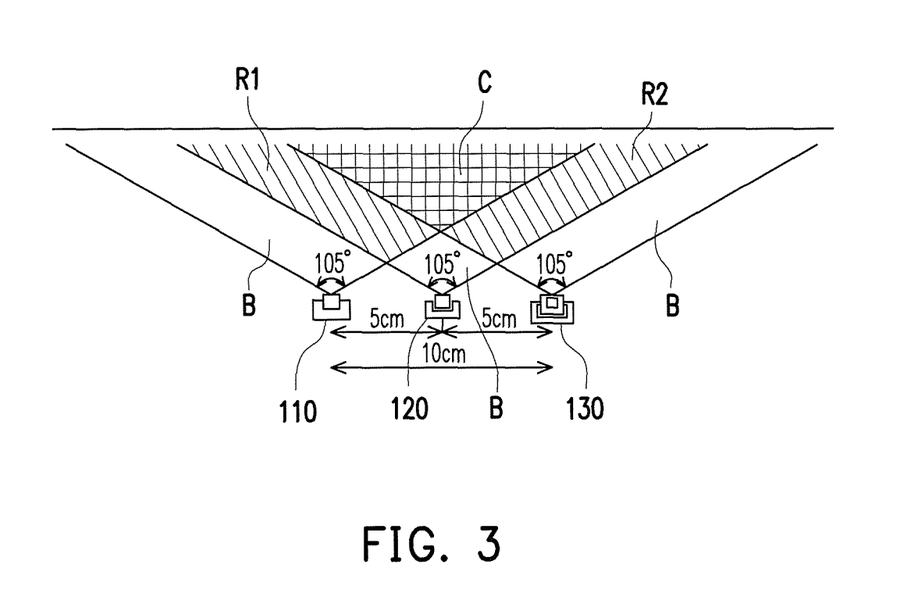
FIG. 3 illustrates a schematic diagram of concurrently capturing a specific scene by image capturing devices according to an embodiment of the disclosure.

To be specific, FIG. 3 illustrates a schematic diagram of concurrently capturing a specific scene by image capturing devices according to an embodiment of the disclosure.

Referring to FIG. 3, the first image capturing device 110, the second image capturing device 120, and the third image capturing device 130 are equally spaced with 5 cm apart on an auxiliary line and are configured to capture their front images with field of views of 105 degrees. The length of a baseline between the first image capturing device 110 and the second image capturing device 120 (i.e. the first device group) and that between the second image capturing device 120 and the third image capturing device 130 (i.e. the second device group) are both 5 cm. The length of a baseline between the first image capturing device 110 and the third image capturing device 130 (i.e. the third device group) is 10 cm. A region R1 and a region C correspond to the first estimated region of the first device group, and the first depth map would be generated accordingly. A region R2 and the region C correspond to the second estimated region of the second device group, and the second depth map would be generated accordingly. The region C corresponds to the third estimated region of the third device group, and the third depth map would be generated accordingly. It should be noted that, the region C is also referred to as a joint overlapping region of the first estimated region, the second estimated region, and the third estimated region, and each of the region R1 and the region R2 are also referred to as a non-joint overlapping region. Since the first estimated region, the second estimated region, and the third estimated region are only partial regions of the scene, the image processing device 140 would integrate depth information of the region R1, the region R2, and the region C according to the three depth maps in the follow-up steps so as to generate a single depth map of an estimated region which covers a larger area.

Hence, revisiting FIG. 2, the image processing device 140 would analyze each pixel corresponding to the specific scene so as to respectively calculate its corresponding depth information. Only one of the pixels would be illustrated hereafter, and the other pixels could be deduced based on repeated iteration. The image processing device 140 would determine whether the estimated region in which the currently-processed pixel is located corresponds to the joint overlapping region (Step S204). If no, the image processing device 140 would determine whether the pixel is located in the non-joint overlapping region of the first estimated region, the non-joint overlapping region of the second estimated region, or none of the above (Step S206). When the pixel is located in the non-joint overlapping region of the first estimated region, the image processing device 140 would set the depth information of the pixel to its corresponding depth value in the first depth map (Step S208). When the pixel is located in the non-joint overlapping region of the second estimated region, the image processing device 140 would set the depth information of the pixel to its corresponding depth value in the second depth map (Step S210). On the other hand, when the pixel does not belong to any of the estimated regions, the image processing device 140 would set the pixel as a bad pixel with no depth information (Step S211).

Figure 4A:
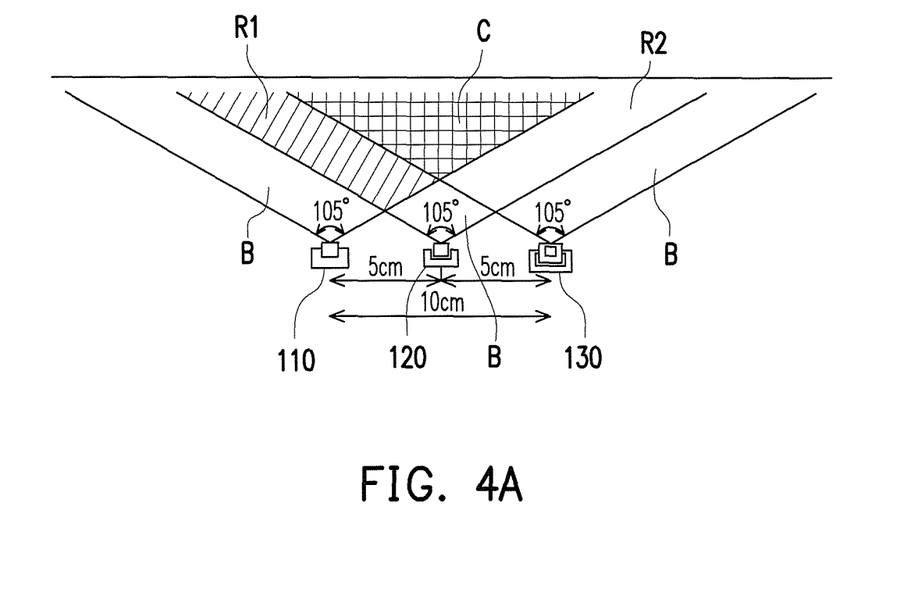
FIG. 4A, FIG. 4B, and FIG. 4C illustrate schematic diagrams of regions respectively corresponding to Step S208, Step S210, and Step S211 according to an embodiment of the disclosure.
Figure 4B:
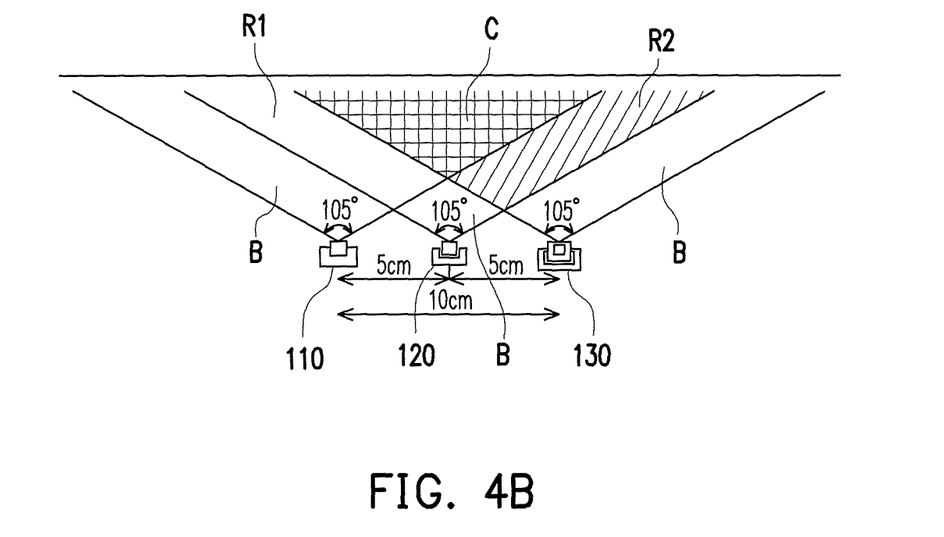
Figure 4C:
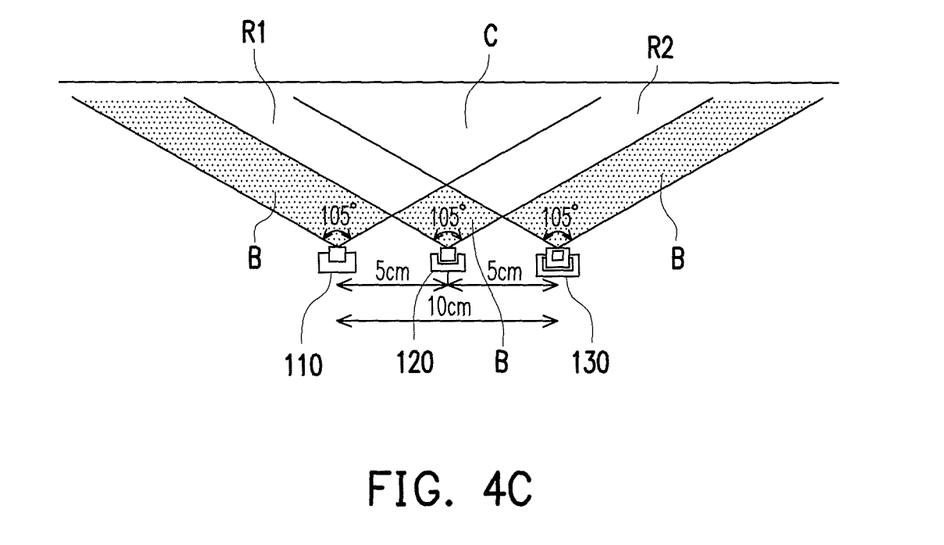

To be specific, FIG. 4A, FIG. 4B, and FIG. 4C illustrate schematic diagrams of regions respectively corresponding to Step S208, Step S210, and Step S211 according to an embodiment of the disclosure.

Referring to FIG. 4A, when the image processing device 140 determines that the pixel is located in the non-joint overlapping region of the first estimated region (i.e. the region R1), it would obtain the depth value of the pixel according to its pixel coordinate in the first depth map.

Referring to FIG. 4B, when the image processing device 140 determines that the pixel is located in the non-joint overlapping region of the second estimated region (i.e. the region R2), it would obtain the depth value of the pixel according to its pixel coordinate in the second depth map.

Next, referring to FIG. 4C, when the image processing device 140 determines that the pixel is located in a region B outside of the region R1, the region R2, and the region C, it represents that such pixel is located in a region captured by only one image capturing device and would be considered as a bad pixel with no depth information.

Revisiting FIG. 2, when the image processing device 140 determines that the estimated region in which the pixel is located is in the joint overlapping region, it would further determine whether an object distance corresponding to the pixel is greater than a distance threshold (Step S212). The object distance could be calculated based on the depth value of the pixel in the first depth map or the second depth map. The current step is performed since baselines with different lengths could result in different accuracy levels in estimating depth information at different object distances. For example, when the depth map corresponding to the baseline with the length of 5 cm is used, the accuracy in estimating depth information of an object which is more than 3 m away would be drastically decreased. When the depth map corresponding to the baseline with the length of 15 cm is then used, a reliable range for depth estimation could be increased to around 9 m. Accordingly, when the object distance corresponding to the pixel is greater than the distance threshold, the image processing device 140 would use the depth map generated by the device group corresponding to the baseline with a larger length. In other words, the image processing device 140 would set the depth information of the pixel to its depth value corresponding to the third depth map (Step S214).

Figure 4D:
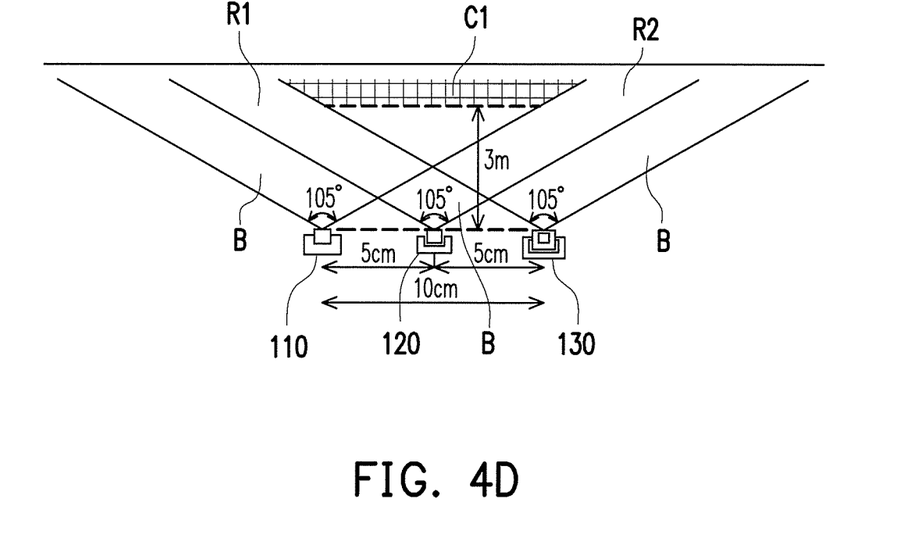
FIG. 4D illustrates a schematic diagram of a region corresponding to Step S214 according to an embodiment of the disclosure.

To be specific, FIG. 4D illustrates a schematic diagram of a region corresponding to Step S214 according to an embodiment of the disclosure. Also, FIG. 4E illustrates a schematic diagram of a region corresponding to the follow-up Steps S216-S222 according to an embodiment of the disclosure.

Referring first to FIG. 4D, assume that the distance threshold is set to 3 m. When the image processing device 140 determines that the pixel is located in a far-distance region C1 which is more than 3 m away from the baseline in the joint overlapping region C, it would obtain the depth information of the pixel according to the third depth map corresponding to the baseline with a longer length.

Figure 4E:
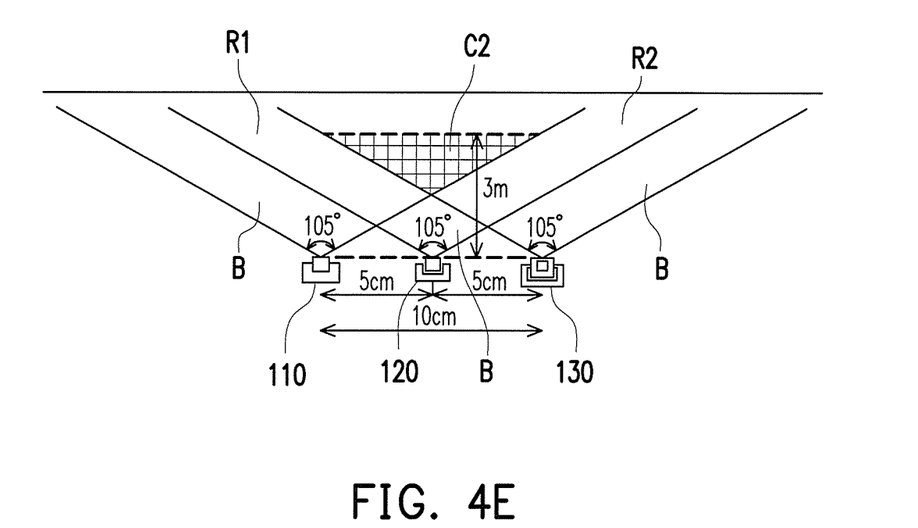
FIG. 4E illustrates a schematic diagram of a region corresponding to Steps S216-S222 according to an embodiment of the disclosure.

On the other hand, referring to FIG. 4E, when the image processing device 140 determines that the pixel is located in a near-distance region C2 which is within 3 m from the baseline in the joint overlapping region C, in a more rigorous approach, it would obtain the depth information of the pixel on a basis of the location of the pixel, the first depth map as well as the second map. This is due to the fact that such region is located around the center of the scene and is likely to be the focus of an image.

To be specific, according to characteristics of stereo images, when an object is located at a same spot, a shorter baseline would create a smaller disparity while a longer baseline would create a larger disparity. Accordingly, revisiting FIG. 2, when the pixel is located in the joint overlapping region and the corresponding object distance is not greater than the distance threshold (e.g. the region C2 in FIG. 4E), the image processing device 140 would obtain a relative position of an optical axis of the second image capturing device 120 with respect to the first image capturing device 110 (Step S216) and determine whether the pixel is located at the relative position of the first image capturing device 110 (Step S218). In general, when the pixel is located at the relative position of the first image capturing device 110, it represents that the pixel is not deviated from the optical axis, and the image processing device 140 would thus set the depth information of the pixel to its corresponding depth value in the first depth map (Step S220). In other words, when the object does not is not deviated from the optical axis, the depth information of the object could be obtained by simply using the first depth map since the sizes of the object captured by the first device group with a shorter baseline are not notably different. In another embodiment, the image processing device 140 could also determine whether the depth values of the pixel respectively in the first depth map and the second depth map are equal for two-way confirmation. If yes, the image processing device 140 would confirm the depth value of the pixel. If not, the image processing device 140 would set the pixel as a bad pixel with no depth information.

On the other hand, when the pixel is not located at the relative position of the first image capturing device 110, the image processing device 140 would set the depth information of the pixel to a weighted average of the depth values of the pixel in the first depth map and the second depth map (Step S222). To be specific, when the object is deviated from the optical axis, the sizes and the distances of the object captured by the first device group and the second device group would be different, and the image processing device 140 would set the depth information of the pixel to, for example, an average of its pixel value corresponding to the first depth map and its pixel value corresponding to the second depth map. In other embodiments, the image processing device 140 could also adjust the weight between the two depth values based on a desired result. The disclosure is not limited in this regard.

When the image processing device 140 obtains the depth information of all the pixels corresponding to the scene in an iterative fashion, it would then generate an integrated depth map (Step S224). As opposed to the depth maps respectively formed by any two of the image capturing devices, the integrated depth map would cover a larger area with higher accuracy. Moreover, in another embodiment, the image processing device 140 could smooth out the integrated depth map by using a median filter to fill up any bad pixels or to reduce noises.

Figure 5:
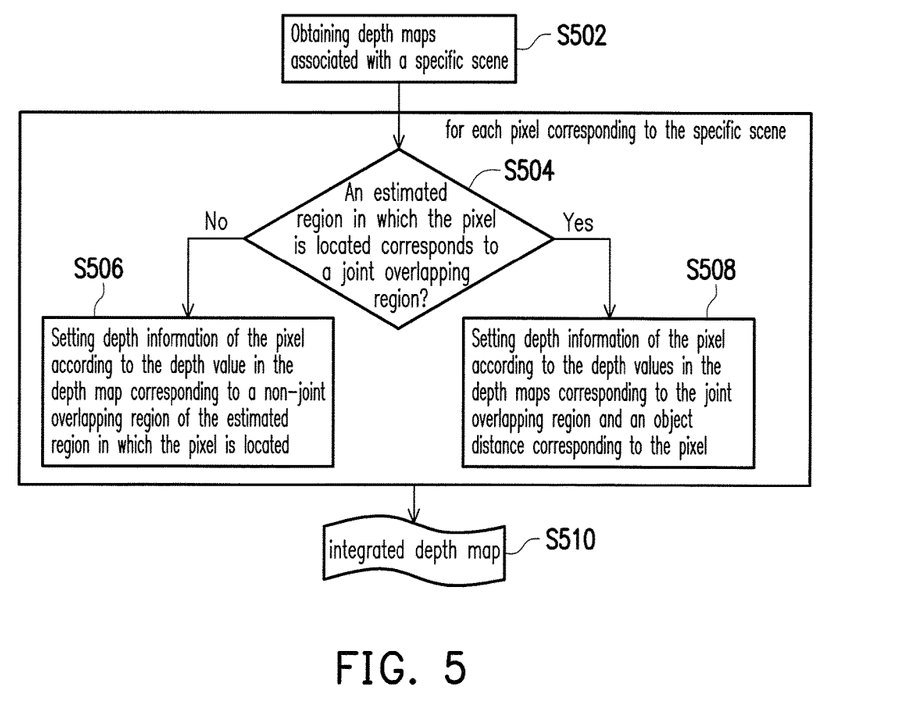
FIG. 5 illustrates a flowchart of a method for generating depth information according to another embodiment of the disclosure.

The proposed method in FIG. 2 could be summarized by a flowchart of a method for generating depth information as illustrated in FIG. 5 according to an embodiment of the disclosure. However, the method in FIG. 5 is adapted to at least three image capturing devices, where their arrangement and settings of camera parameters are not restricted.

Referring to FIG. 5, the image processing device 140 would obtain depth maps associated with a specific scene and corresponding to different device groups (Step S502). The device groups are different groups respectively formed by every two of the image capturing devices. Each of the depth maps corresponds to a different estimated region of the specific scene. Each of the estimated regions shares a joint overlapping region with the other estimated regions.

Next, the image processing device 140 would analyze each pixel corresponding to the specific scene so as to respectively calculate its corresponding depth information. Only one of the pixels would be illustrated hereafter, and the other pixels could be deduced based on repeated iteration. The image processing device 140 would determine whether the estimated region in which the currently-processed pixel is located corresponds to the joint overlapping region (Step S504). If no, the image processing device 140 would set depth information of the pixel according to a depth value in a depth map corresponding to a non-joint overlapping region of the estimated region in which the pixel is located (Step S506). If yes, the image processing device 140 would set depth information of the pixel according to depth values in the depth maps corresponding to the joint overlapping region and an object distance corresponding to the pixel (Step S508). When the image processing device 140 obtains depth information of all the pixels corresponding to the scene in an iterative fashion, it would then generate an integrated depth map (Step S510). Details of Steps S502~S510 could refer to related descriptions in FIG. 2 and would not be repeated herein.

In summary, in the proposed method and the system for generating depth information, depth information of a specific scene is generated through the use of image capturing device groups with different lengths of baselines, and a reliable range as well as an accuracy for depth estimation would be increased so that the effectiveness of stereo vision application such as structured light, stereo, distance detection, and surveillance would be greatly enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating depth information, adapted to a system having at least three image capturing devices and comprising the following steps:

obtaining a plurality of depth maps associated with a specific scene and corresponding to a plurality of different device groups, wherein the device groups are a plurality of different groups respectively formed by every two of the image capturing devices, wherein each of the depth maps comprises a plurality of depth values and corresponds to a different estimated region of the specific scene, and wherein each of the estimated regions and other of the estimated regions comprise a joint overlapping region;

for each pixel corresponding to the specific scene:
determining whether the estimated region in which the pixel is located corresponds to the joint overlapping region;
in response to determination that the estimated region in which the pixel is located does not correspond to the joint overlapping region, setting depth information of the pixel according to a depth value thereof in a depth map corresponding to a non-joint overlapping region outside the joint overlapping region of the estimated region in which the pixel is located; and
in response to determination that the estimated region in which the pixel is located corresponds to the joint overlapping region, setting the depth information of the pixel according to a plurality of depth values thereof in a plurality of depth maps corresponding to the joint overlapping region and a relationship between a distance threshold and an object distance corresponding to the pixel comprising:
  determining whether the pixel is within a first region or a second region of the joint-overlapping region, wherein the pixel is within the first region in response to the object distance being greater than the distance threshold, and wherein the pixel is within the second region in response to the object distance not being greater than the distance threshold;
  setting the depth information of the pixel to the depth value thereof in a first selected depth map of the depth maps in response to the pixel being within the first region; and
  setting the depth information of the pixel to the depth value thereof in a second selected depth map of the depth maps in response to the pixel being within the second region; and
generating an integrated depth map by using the depth information of the pixels.

2. The method according to claim 1, wherein the image capturing devices are collinearly disposed and equally spaced apart.

3. The method according to claim 2, wherein the image capturing devices have a same field of view and comprise a first image capturing device, a second image capturing device, and a third image capturing device, wherein the second image capturing device is disposed between the first image capturing device and the third image capturing device, wherein the first image capturing device and the second image capturing device is a first device group among the groups, the second image capturing device and the third image capturing device is a second device group among the groups, and the first image capturing device and the third image capturing device is a third device group among the groups, wherein the first device group, the second device group, and the third device group respectively correspond to a first estimated region, a second estimated region, and a third estimated region among the estimated regions and respectively correspond to a first depth map, a second depth map, and a third depth map among the depth maps.

4. The method according to claim 3, wherein for each of the pixels, when the estimated region in which the pixel is located does not correspond to the joint overlapping region, the step of setting the depth information of the pixel according to the depth value thereof in the depth map corresponding to the non-joint overlapping region outside the joint overlapping region of the estimated region in which the pixel is located comprises:
  setting the depth information of the pixel to the depth value thereof in the first depth map when the pixel is located in the non-joint overlapping region of the first estimated region; and
  setting the depth information of the pixel to the depth value thereof in the second depth map when the pixel is located in the non-joint overlapping region of the second estimated region.

5. The method according to claim 3, wherein for each of the pixels, when the estimated region in which the pixel is located corresponds to the joint overlapping region, the step of setting the depth information of the pixel according to the depth values in the depth maps corresponding to the joint overlapping region and the relationship between the distance threshold and the object distance corresponding to the pixel comprises:
  calculating the object distance corresponding to the pixel according to the depth value of thereof in the first depth map or the second depth map;
  determining whether the object distance corresponding to the pixel is greater than the distance threshold;
  in response to determination that the object distance corresponding to the pixel is greater than the distance threshold, setting depth information of the pixel to the depth value thereof in the third depth map; and
  in response to determination that the object distance corresponding to the pixel is not greater than the distance threshold, setting the depth information of the pixel according to the depth value thereof in at least one of the first depth map and the second depth map.

6. The method according to claim 5, wherein for each of the pixels, when the object distance corresponding to the pixel is not greater than the distance threshold, the step of setting the depth information of the pixel according to the depth value thereof in at least one of the first depth map and the second depth map comprises:
  obtaining a relative position of an optical axis of the second image capturing device with respect to the first image capturing device;
  determining whether the pixel is located at the relative position of the first image capturing device;
  in response to determination that the pixel is located at the relative position of the first image capturing device, setting the depth value of the pixel in the first depth map as the depth information of the pixel; and
  in response to determination that the pixel is not located at the relative position of the first image capturing device, setting the depth information of the pixel to a weighted average of the depth value of the pixel in the first depth map and the depth value of the pixel in the second depth map.

7. The method according to claim 6, wherein for each of the pixels, when the pixel is located at the relative position of the first image capturing device, the method further comprises:
  determining whether the depth value of the pixel in the first depth map is equal to that in the second depth map; and
  in response to determination that the depth value of the pixel in the first depth map is not equal to that in the second depth map, setting the pixel as a bad pixel with no depth information.

8. The method according to claim 1, wherein for each of the pixels, when the pixel is not located in any of the estimated regions, the method further comprises:
  setting the pixel as a bad pixel with no depth information.

9. The method according to claim 1, wherein a length of a baseline between the two image capturing devices corresponding to the first selected depth map is greater than a length of a baseline between the two image capturing devices corresponding to the second selected depth map.

10. A system for generating depth information comprising:
  at least three image capturing devices, respectively configured to capture images of a specific scene, wherein every two of the image capturing devices form a plurality of different device groups; and
  an image processing device, connected to each of the image capturing devices and configured to:
    obtain a plurality of depth maps associated with the specific scene and corresponding to the device groups according to the images captured by the image capturing devices, wherein each of the depth maps comprises a plurality of depth values and corresponds to a different estimated region of the specific scene, and wherein each of the estimated regions and other of the estimated regions comprise a joint overlapping region;

for each pixel corresponding to the specific scene:
  determine whether the estimated region in which the pixel is located corresponds to the joint overlapping region;
  in response to determination that the estimated region in which the pixel is located does not correspond to the joint overlapping region, set depth information of the pixel according to a depth value thereof in a depth map corresponding to a non-joint overlapping region outside the joint overlapping region of the estimated region in which the pixel is located; and
  in response to determination that the estimated region in which the pixel is located corresponds to the joint overlapping region, set the depth information of the pixel according to a plurality of depth values thereof in a plurality of depth maps corresponding to the joint overlapping region and a relationship between a distance threshold and an object distance corresponding to the pixel comprising:
    determine whether the pixel is within a first region or a second region of the joint-overlapping region, wherein the pixel is within the first region in response to the object distance being greater than the distance threshold, and wherein the pixel is within the second region in response to the object distance not being greater than the distance threshold;
    set the depth information of the pixel to the depth value thereof in a first selected depth map of the depth maps in response to the pixel being within the first region; and
    set the depth information of the pixel to the depth value thereof in a second selected depth map of the depth maps in response to the pixel being within the second region; and
  generate an integrated depth map by using the depth information of the pixels.

11. The system according to claim 10, wherein the image capturing devices are collinearly disposed and equally spaced apart.

12. The system according to claim 11, wherein the image capturing devices have a same field of view and comprise a first image capturing device, a second image capturing device, and a third image capturing device, wherein the second image capturing device is disposed between the first image capturing device and the third image capturing device, wherein the first image capturing device and the second image capturing device is a first device group among the groups, the second image capturing device and the third image capturing device is a second device group among the groups, and the first image capturing device and the third image capturing device is a third device group among the groups, wherein the first device group, the second device group, and the third device group respectively correspond to a first estimated region, a second estimated region, and a third estimated region among the estimated regions and respectively correspond to a first depth map, a second depth map, and a third depth map among the depth maps.

13. The system according to claim 12, wherein for each of the pixels:
  when the image processing device determines that the pixel is located in the first estimated region of the non-joint overlapping region, the image processing device sets the depth information of the pixel to the depth value thereof in the first depth map; and
  when the image processing device determines that the pixel is located in the second estimated region of the non-joint overlapping region, the image processing device sets the depth information of the pixel to the depth value thereof in the second depth map.

14. The system according to claim 12, wherein for each of the pixels:
  when the image processing device determines that the estimated region in which the pixel is located corresponds to the joint overlapping region, the image processing device calculates the object distance corresponding to the pixel according to the depth value of thereof corresponding to the first depth map or the second depth map and determines whether the object distance corresponding to the pixel is greater than the distance threshold;
  in response to determination that the object distance corresponds to the pixel is greater than the distance threshold, the image processing device sets depth information of the pixel to the depth value thereof in the third depth map; and
  in response to determination that the object distance corresponds to the pixel is not greater than the distance threshold, the image processing device sets the depth information of the pixel according to the depth value thereof in at least one of the first depth map and the second depth map.

15. The system according to claim 14, wherein for each of the pixels:
  when the object distance corresponding to the pixel is not greater than the distance threshold, the image processing device obtains a relative position of an optical axis of the second image capturing device with respect to the first image capturing device and determines whether the pixel is located at the relative position of the first image capturing device;
  in response to determination that the pixel is located at the relative position of the first image capturing device, the image processing device sets the depth value of the pixel in the first depth map as the depth information of the pixel; and
  in response to determination that the pixel is not located at the relative position of the first image capturing device, the image processing device sets the depth information of the pixel to a weighted average of the depth value of the pixel in the first depth map and the depth value of the pixel in the second depth map.

16. The system according to claim 15, wherein for each of the pixels:
  when the pixel is located at the relative position of the first image capturing device, the image processing device further determines whether the depth value of the pixel in the first depth map is equal to that in the second depth map; and
  in response to determination that the depth value of the pixel in the first depth map is not equal to that in the second depth map, the image processing device sets the pixel as a bad pixel with no depth information.

17. The system according to claim 10, wherein for each of the pixels, when the pixel is not located in any of the estimated regions, the image processing device further sets the pixel as a bad pixel with no depth information.

* * * * *